United States Patent
Kawamoto et al.

(10) Patent No.: US 6,754,572 B2
(45) Date of Patent: Jun. 22, 2004

(54) HYDRAULIC PRESSURE CONTROL APPARATUS OF AUTOMATIC TRANSMISSION

(75) Inventors: Tsuyoshi Kawamoto, Anjo (JP); Akira Isogai, Anjo (JP); Kazufumi Ando, Anjo (JP); Yoshihisa Yamamoto, Anjo (JP); Shigetaka Wakisaka, Anjo (JP); Takayuki Kubo, Anjo (JP); Munehiro Tashiro, Anjo (JP)

(73) Assignee: Aisin AW Co., Ltd. (JP)

( * ) Notice: Subject to any disclaimer, the term of this patent is extended or adjusted under 35 U.S.C. 154(b) by 27 days.

(21) Appl. No.: 10/127,707

(22) Filed: Apr. 23, 2002

(65) Prior Publication Data

US 2002/0198647 A1 Dec. 26, 2002

(30) Foreign Application Priority Data

Apr. 25, 2001 (JP) ..... 2001-128362
Apr. 25, 2001 (JP) ..... 2001-128363

(51) Int. Cl.$^7$ ............................................. G06F 17/00
(52) U.S. Cl. ........................................... 701/51; 701/54
(58) Field of Search ..................... 701/51, 54; 475/116, 475/120; 477/156

(56) References Cited

U.S. PATENT DOCUMENTS 5,109,733 A * 5/1992 Ishikawa et al. ............ 475/120
5,782,711 A * 7/1998 Tsutsui et al. .............. 477/156

FOREIGN PATENT DOCUMENTS

JP      11-93987      4/1999

* cited by examiner

*Primary Examiner*—Marthe Y. Marc-Coleman
(74) *Attorney, Agent, or Firm*—Lorusso, Loud & Kelly

(57) ABSTRACT

A system for control of the discharge pressure of an input clutch hydraulic servo at the time of a D→N shift, in which the peak value (DN_Omega_max) rate of change of the rotational speed of an input shaft increases if the initial value (DN sol Sweep Start SLT signal) of the pressure adjusting control becomes high or low. A convergence region (DN_Omega_limit_max) is provided. On the basis of comparison between the previous peak value (DN_Omega_max_ave1) and the present peak value (DN_Omega_max_ave2), and the direction of correction, the learning is performed in accordance with various maps in a direction toward the convergence region.

16 Claims, 10 Drawing Sheets

|   | C1 | C2 | C3 | B1 | B2 | B3 | B4 | B5 | F1 | F2 |
|---|---|---|---|---|---|---|---|---|---|---|
| N |   |   |   |   |   |   |   | ○ |   |   |
| 1ST | ○ |   |   |   |   | ◌ |   | ○ |   | ○ |
| 2ND | ○ |   |   | □ | ○ |   |   | ○ | ○ |   |
| 3RD | ○ |   |   | ○ | ○ |   | ○ |   | ○ |   |
| 4TH | ○ |   | ○ | ○ | ○ |   |   |   | ○ |   |
| 5TH | ○ | ○ | ○ |   | ○ |   |   |   |   |   |
| 3Low | ○ | ○ |   |   | ○ |   |   | ○ |   |   |
| 4Low | ○ | ○ |   |   | ○ |   | ○ |   |   |   |
| REV |   | ○ |   |   |   | ○ |   | ○ |   |   |

◌ OPERATED FOR ENGINE BRAKE
□ OPERATED WHEN NEEDED

FIG.3

TIME CHART

D-N CONTROL FLOW CHART

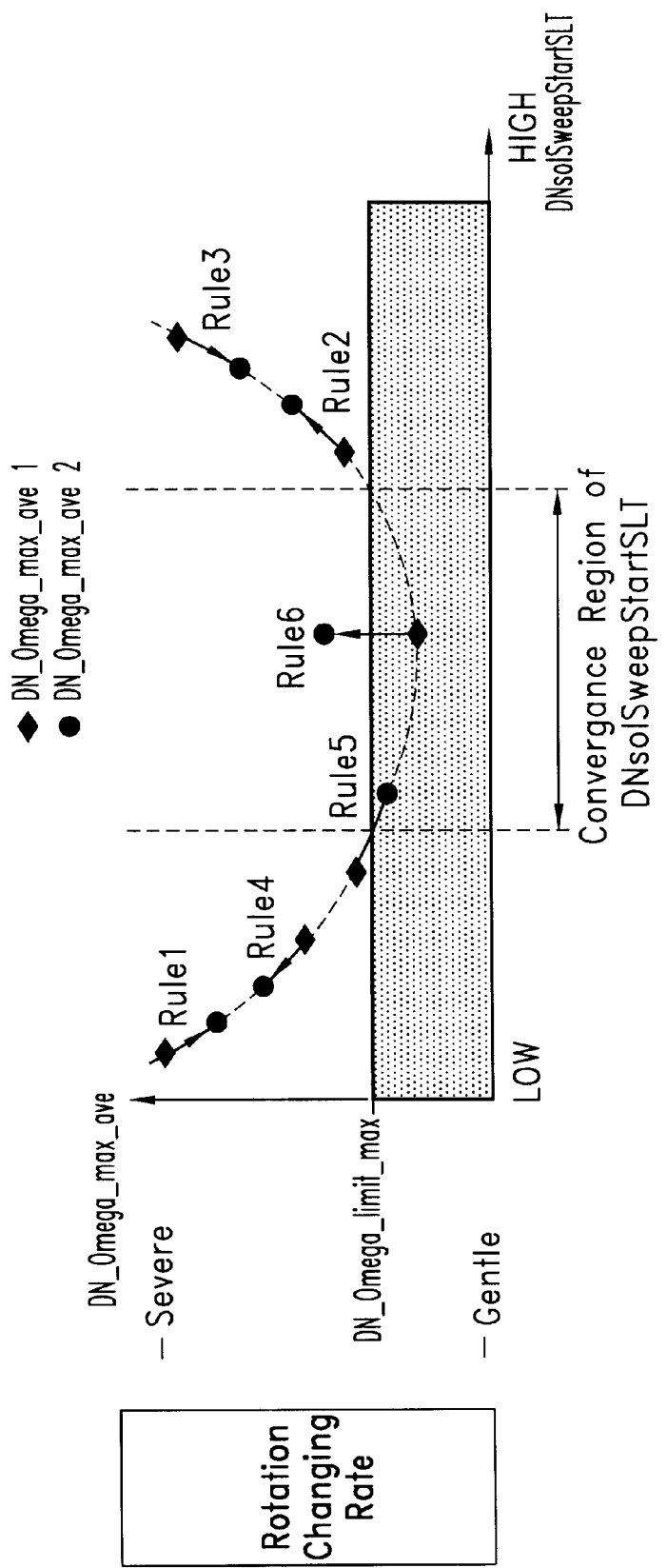

Rule1

Rule2

Rule3

Rule4

Rule5

Rule6

HYDRAULIC PRESSURE CONTROL APPARATUS OF AUTOMATIC TRANSMISSION

INCORPORATION BY REFERENCE

The disclosure of Japanese Patent Application No. 2001-128363 filed on Apr. 25, 2000, including the specification, drawings and abstract thereof, is incorporated herein by reference in its entirety.

BACKGROUND OF THE INVENTION

1. Field of the Invention

The invention relates to a learning control in a hydraulic pressure control apparatus of an automatic transmission and, more particularly, to a learning control that is suitable for use in, for example, a discharge control of the hydraulic pressure that is drained at the time of switching from a running range to neutral (N) in a hydraulic pressure control apparatus of an automatic transmission, in response to an operation of a shift lever or the like.

2. Description of the Related Art

Conventional automatic transmissions (including multi-speed stage automatic transmissions (AT) and continuously variable transmissions (CVT)) have an input clutch hydraulic servo that is supplied with hydraulic pressure (range pressure) from a D-range port of a manual valve. An oil passage connected to the hydraulic servo is provided with a neutral relay valve that is operated by a solenoid valve, and a control valve that is controlled by a linear solenoid valve (see, for example, Japanese Patent Application Laid-Open No. HEI 11-93987).

When the shift lever is moved from the neutral (N) position to the D range position, the line pressure from the D range port of the manual shift valve is supplied to the input clutch hydraulic servo via the control valve and the relay valve. By controlling the control valve via the linear solenoid valve during this operation, the supply of hydraulic pressure is smoothly started, so that shift shock at the time of a N–D shift is prevented.

Conversely, if the shift lever is moved from the D range position to neutral, the relay valve is switched so that the hydraulic pressure of the input clutch hydraulic servo is discharged from the drain port of the manual shift valve via a check valve and an orifice. Due to the amount of flow out of the orifice and the operation of an accumulator, a shock which might otherwise be caused by a rapid torque reduction is prevented.

In the above-described hydraulic pressure control apparatus, the hydraulic pressure on the input clutch is discharged without being controlled at the time of the D–N shift, so that the amount of flow discharged from the input clutch hydraulic servo changes depending on the oil temperature. If the oil temperature is high, a rapid torque reduction may occur causing a shift shock. If the oil temperature is low, the torque on the input clutch is prolonged, to the detriment of shift responsiveness. In that case, it is desirable that the hydraulic pressure of the hydraulic servo be adjusted and controlled. However, pressure adjusting control based on oil temperature or the like varies considerably and thus is insufficiently reliable. In particular, precise control of the discharge from the input clutch hydraulic servo is needed because it muse be performed within the small amount of time before the base pressure of the hydraulic servo is completely discharged from an orifice at the time of a D–N shift.

SUMMARY OF THE INVENTION

Accordingly, it is an object of the invention to provide a hydraulic pressure control apparatus of an automatic transmission that solves the aforementioned problems by performing a learning control.

In order to achieve the above objective, the present invention provides an automatic transmission hydraulic pressure control apparatus including valve control means for adjusting and controlling, in accordance with an instruction value, a hydraulic control pressure on a hydraulic servo which, in turn, switches a frictional engagement element between a first state and a second state, e.g., engaged and disengaged, in a shift. The shift may be between different ranges or between different speed stages within the drive range. A detecting means detects the amount of change in rotational speed of a rotating transmission element, which change results from the switch between the first state and the second state. A controller is provided with learning control means for correcting the instruction value for the control valve means based on a comparison between the amount of change in a previous shift and the amount of change resulting from a present switch, e.g., shift. Then, in a next subsequent switch, the instruction value controlling the control valve means is an instruction value as corrected by the learning control means of the controller. The learning control means may also take into account the direction of the immediately previous correction.

In a preferred embodiment, the learning control means includes a plurality of maps for determining a subsequent correction value and a subsequent correcting direction based on the comparison between the previous amount of change and the present amount of change and also based on direction of the immediately previous correction.

The amount of change detected by the detecting means may be a mean value obtained for a plurality of switches or shifts. The learning control operates with a convergence region defined by upper and lower threshold values and where the immediately previous instruction value is outside of the convergence region, that instruction value is corrected to increase the previous amount of change in a direction toward the convergence region. On the other hand, if the immediately previous amount of change, e.g., in the rotational speed of the transmission input shaft, is within the convergence region whereas the present amount of change is outside of the convergence region, the instruction value is corrected by lowering by a predetermined amount.

The amount of change detected by the detecting means may be a change in the rotational speed of the transmission input shaft or, for example, a peak value of rotational acceleration of the input side of the friction engagement element.

Preferably, the controller outputs a predetermined initial value at the time of the switch, e.g., shift, and then outputs a sweep-down at a predetermined sweep angle. That predetermined initial value may be set based on the temperature of oil within the automatic transmission.

In the preferred embodiment, the value control means includes a first control valve disposed between the hydraulic servo and a running range port of the manual shift valve and a second control valve that controls the first control valve by adjusting a control pressure to the first control valve, which control pressure is based on the instruction value from the controller. The first and second control valves may be disposed in an oil passage in parallel with another oil passage providing a direct fluid connection between the hydraulic servo and the running range port and having therein an orifice and a check valve.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a table of operations of the gear train illustrated by the skeletal diagram of FIG. 2;

FIG. 8 is a diagram illustrating learning control in accordance with the invention;

DETAILED DESCRIPTION OF PREFERRED EMBODIMENTS

Preferred embodiments of the invention will now be described hereinafter with reference to the drawings.

Figure 2:
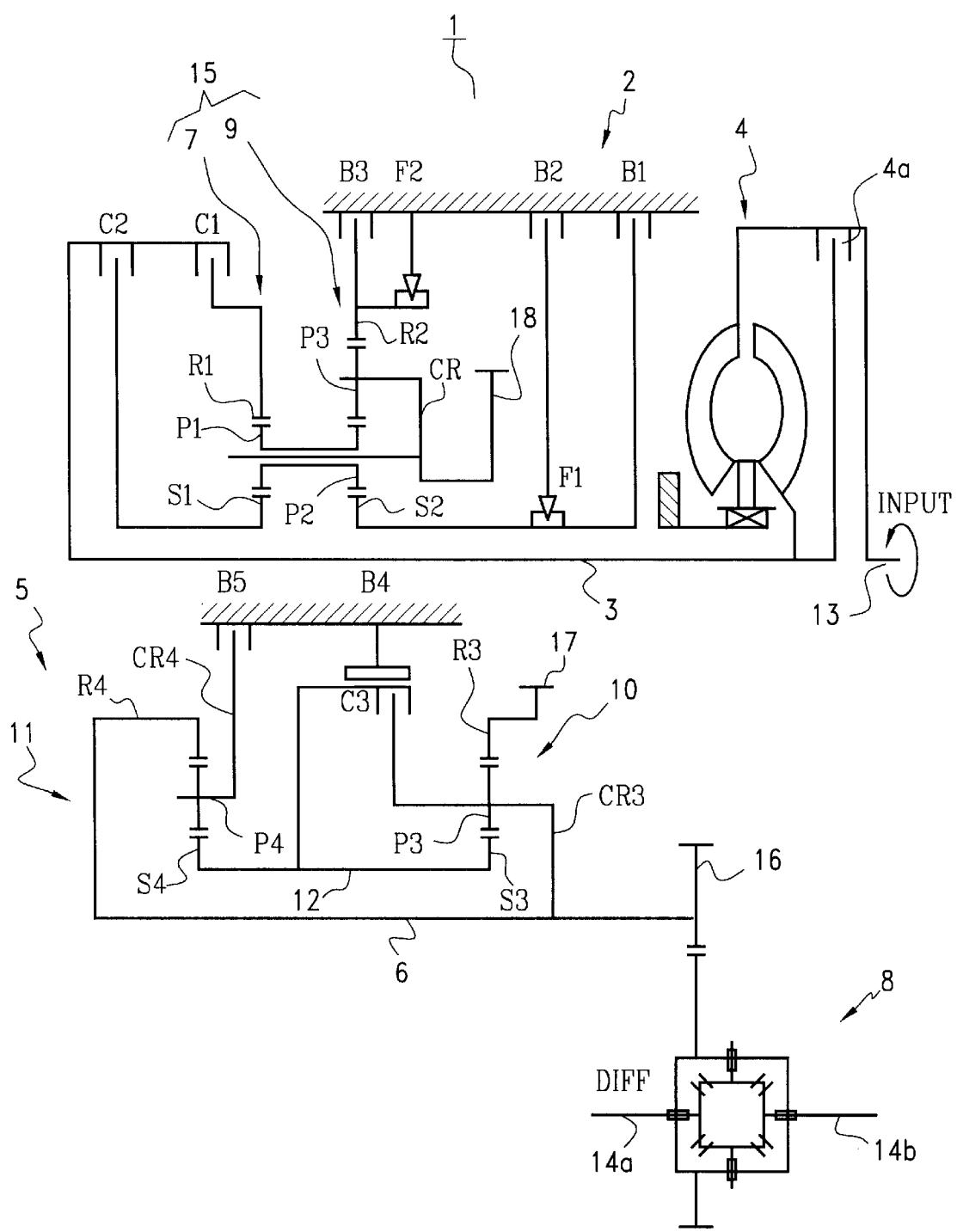
FIG. 2 is a skeletal diagram illustrating a portion (gear train) of an automatic transmission to which the invention is applicable.

FIG. 2 shows a 5-speed automatic transmission 1 having a torque converter 4, a 3-speed main shift mechanism 2, a 3-speed subsidiary shift mechanism 5 and a differential 8. These components are operatively connected and are housed in an integrally formed case. The torque converter 4 has a lockup clutch 4a and receives input torque at an input shaft 3 of the main shift mechanism 2 from an engine crankshaft 13, via oil currents within the torque converter or via a mechanical connection formed by the lockup clutch 4a. A first shaft 3 (more specifically, the input shaft) aligned with the crankshaft, a second shaft 6 (counter shaft) parallel to the first shaft 3, and third shafts (right and left axles) 14a, 14b are rotatably supported on the integral case. A valve body is disposed on the exterior of the case.

The main shift mechanism 2 has a planetary gear assembly 15 that includes a simple planetary gear unit 7 and a double-pinion planetary gear unit 9. The simple planetary gear unit 7 includes a sun gear S1, a ring gear R1, and a carrier CR supporting pinions P1 meshed with the sun gear S1 and the ring gear R1. The double-pinion planetary gear unit 9 includes a sun gear S2 having teeth different in number from those of the sun gear S1, a ring gear R2, and the common carrier CR supporting pinions P2 meshed with the sun gear S2 and pinions P3 meshed with the ring gear R2, as well as supporting the pinions P1 of the simple planetary gear unit 7.

The input shaft 3 drivingly connected to the engine crankshaft 13 via the torque converter 4 is connectable to the ring gear R1 of the simple planetary gear unit 7 via an input (forward) clutch C1, and is also connectable to the sun gear S1 of the simple planetary gear unit 7 via a second (direct) clutch C2. The sun gear S2 of the double-pinion planetary gear unit 9 may be directly stopped by a first brake B1, and is also stoppable by a second brake B2 via a first one-way clutch F1. Furthermore, the ring gear R2 of the double-pinion planetary gear unit 9 is stoppable by a third brake B3 and a second one-way clutch F2 disposed in parallel to the third brake B3. The common carrier CR is connected to a counter drive gear 18 that serves as an output member of the main shift mechanism 2.

The subsidiary shift mechanism 5, on the other hand, includes an output gear 16, a first simple planetary gear unit 10 and a second simple planetary gear unit 11 that are axially disposed in that sequence along the counter shaft 6 (second shaft). The counter shaft 6 is rotatably supported by the integral case via a bearing. The first and second simple planetary gears units 10, 11 are the Simpson type.

In the first simple planetary gear unit 10, a ring gear R3 is connected to a counter driven gear 17 meshed with the counter drive gear 18, and a sun gear S3 is connected to a sleeve shaft 12 that is rotatably supported on the counter shaft 6. Furthermore, pinions P3 are supported by a carrier CR3 that is formed as a flange fixed to the counter shaft 6. The carrier CR3 supporting the pinions P3 at the opposite end thereof is connected to an inner hub of a UD direct clutch C3. In the second simple planetary gear unit 11, a sun gear S4 is formed on the sleeve shaft 12, and is thereby connected to the sun gear S3 of the first simple planetary gear unit 10. A ring gear R4 of the second simple planetary gear unit 11 is connected to the counter shaft 6.

The UD direct clutch C3 is disposed between the carrier CR3 of the first simple planetary gear unit 10 and the interconnected sun gears S3, S4. The interconnected sun gears S3, S4 are stoppable by a fourth brake B4 in the form of a hand brake. A carrier CR4 supporting pinions P4 of the second simple planetary gear unit 11 is stoppable by a fifth brake B5.

Next, operation of the mechanical portion of the 5-speed automatic transmission will be described with reference to FIGS. 2 and 3.

In first speed (1ST) in a D (drive) range, the forward clutch C1 is connected and the fifth brake B5 and the second one-way clutch F2 are engaged, so that the ring gear R2 of the double-pinion planetary gear unit 9 and the carrier CR4 of the second simple planetary gear unit 11 are held against rotation (stopped). In this state, rotation of the input shaft 3 is transferred to the ring gear R1 of the simple planetary gear unit 7 via the forward clutch C1. Furthermore, since the ring gear R2 of the double-pinion planetary gear unit 9 is stopped, the common carrier CR is forwardly rotated at a considerably reduced speed while the sun gears S1, S2 are reversely rotated. That is, the main shift mechanism 2 is in the first speed state, and the reduced-speed rotation is transferred to the ring gear R3 of the first simple planetary gear unit 10 of the subsidiary shift mechanism 5 via the counter gears 18, 17. The subsidiary shift mechanism 5 is in a first speed state where the carrier CR4 of the second simple planetary gear unit 11 is stopped by a fifth brake B5. The reduced-speed rotation of the main shift mechanism 2 is further reduced in speed by the subsidiary shift mechanism 5, and is output at the output gear 16.

In second speed (2ND), the second brake B2 (and the first brake B1) is operated in addition to the forward clutch C1. Furthermore, the actuation of the second one-way clutch F2 is switched to the actuation of the first one-way clutch F1, and the fifth brake B5 remains engaged. In this state, the sun gear S2 is stopped by the second brake B2 and the first one-way clutch F1. Therefore, rotation of the ring gear R1 of the simple planetary gear unit 7, transferred from the input shaft 3 via the forward clutch C1, turns the carrier CR at a reduced speed in the forward direction while causing idle rotation of the ring gear R2 of the double-pinion planetary gear unit 9 in the forward direction. Furthermore, the reduced-speed rotation is transferred to the subsidiary shift mechanism 5 via the counter gears 18, 17. That is, the main shift mechanism 2 is in a second speed state, and the subsidiary shift mechanism 5 is in the first speed state due to the engagement of the fifth brake B5. This combination of the second speed state and the first speed state achieves second speed for the entire automatic transmission 1 as a whole. Although in this case, the first brake B1 is normally actuated, the first brake B1 is released when the second speed is produced due to a coast-down.

In a third speed (3RD) state, the forward clutch C1, the second brake B2, the first one-way clutch F1 and the first brake B1 are kept engaged. The fifth brake B5 is released and the fourth brake B4 is engaged. That is, the main shift mechanism 2 is kept in the same state as in second speed, and the second-speed rotation is transferred to the subsidiary shift mechanism 5 via the counter gears 18, 17. In the subsidiary shift mechanism 5, rotation from the ring gear R3 of the first simple planetary gear unit 10 is output as second-speed rotation from the carrier CR3 because the sun gear S3 and the sun gear S4 are fixed together. Therefore, the combination of the second speed of the main shift mechanism 2 and the second speed of the subsidiary shift mechanism 5 achieves third speed for the automatic transmission 1 as a whole.

In fourth speed (4TH), the main shift mechanism 2 is in the same state as in second speed and in third speed in which the forward clutch C1, the second brake B2, the first one-way clutch F1 and the first brake B1 are engaged. In the subsidiary shift mechanism 5, the fourth brake B4 is released and the UD direct clutch C3 is engaged. In this state, the carrier CR3 of the first simple planetary gear unit 10 and the sun gears S3, S4 are connected, thereby achieving locked-up rotation in which the planetary gear units 10, 11 rotate together. Therefore, the second speed of the main shift mechanism 2 and the locked-up state (third speed) of the subsidiary shift mechanism 5 combine to output fourth-speed rotation from the output gear 16, for the entire automatic transmission.

In fifth speed ($5^{TH}$), the forward clutch C1 and the direct clutch C2 are engaged, so that rotation of the input shaft 3 is transferred to the ring gear R1 and the sun gear S1 of the simple planetary gear unit 7. Thus, the main shift mechanism 2 produces locked-up rotation in which the gear units rotate together. In this state, the first brake B1 is released, and the second brake B2 is kept in the engaged state. The first one-way clutch F1 idles and, therefore, the sun gear S2 idles. Furthermore, the subsidiary shift mechanism 5 is in the locked-up rotation state in which the UD direct clutch C3 is engaged. Therefore, the third speed (locked-up state) of the main shift mechanism 2 and the third speed (locked-up state) of the subsidiary shift mechanism 5 combine to output fifth-speed rotation from the output gear 16, for the automatic transmission as a whole.

Furthermore, this automatic transmission provides intermediate speed stages that are put into operation during downshifts in acceleration and the like, that is, a third speed-low and a fourth speed-low.

In the third speed-low state, the forward clutch C1 and the direct clutch C2 are engaged (although the second brake B2 is in the engaged state, it is overrun due to the first one-way clutch F1). Thus, the main shift mechanism 2 is in the third speed state in which the planetary gear assembly 15 is locked up. The subsidiary shift mechanism 5 is in the first speed state wherein the fifth brake B5 is engaged. Therefore, the third speed state of the main shift mechanism 2 and the first speed state of the subsidiary shift mechanism 5 combine to achieve a speed stage having a gear ratio that is between the second speed and the third speed, for the automatic transmission 1 as a whole.

In fourth speed-low, the forward clutch C1 and the direct clutch C2 are engaged. Thus, the main shift mechanism 2 is in the third speed (locked-up) state as in the third speed-low state. The subsidiary shift mechanism 5 is in the second speed state wherein the fourth brake B4 is engaged. Therefore, the third speed state of the main shift mechanism 2 and the second speed state of the subsidiary shift mechanism 5 combine to establish a speed stage between the third speed and the fourth speed, for the entire automatic transmission 1 as a whole.

In FIG. 3, a dot-line circle indicates engine braking at the time of coasting (in 4th, 3rd or 2nd speed). That is, during the first speed, the third brake B3 is actuated to prevent rotation of the ring gear R2 due to overrun of the second one-way clutch F2. Furthermore, in second speed, third speed and fourth speed, the first brake B1 is actuated to prevent rotation of the sun gear S1 due to overrun of the first one-way clutch F1.

In R (reverse), the direct clutch C2 and the third brake B3 are engaged, and the fifth brake B5 is engaged. In this state, rotation of the input shaft 3 is transferred to the sun gear S1 via the direct clutch C2. Furthermore, since the ring gear R2 of the double-pinion planetary gear unit 9 is held against rotation by the third brake B3, the carrier CR is reversely rotated while the ring gear R2 of the simple planetary gear unit 9 is reversely and idly rotated. The reverse rotation is transferred to the subsidiary shift mechanism 5 via the counter gears 18, 17. In the subsidiary shift mechanism 5, the carrier CR4 of the second simple planetary gear unit 11 is held against reverse rotation as well by the fifth brake B5, and is therefore held in the first speed state. Therefore, the reverse rotation of the main shift mechanism 2 and the first-speed rotation of the subsidiary shift mechanism 5 combine to output reduced-speed reverse rotation from the output gear 16.

Figure 1:
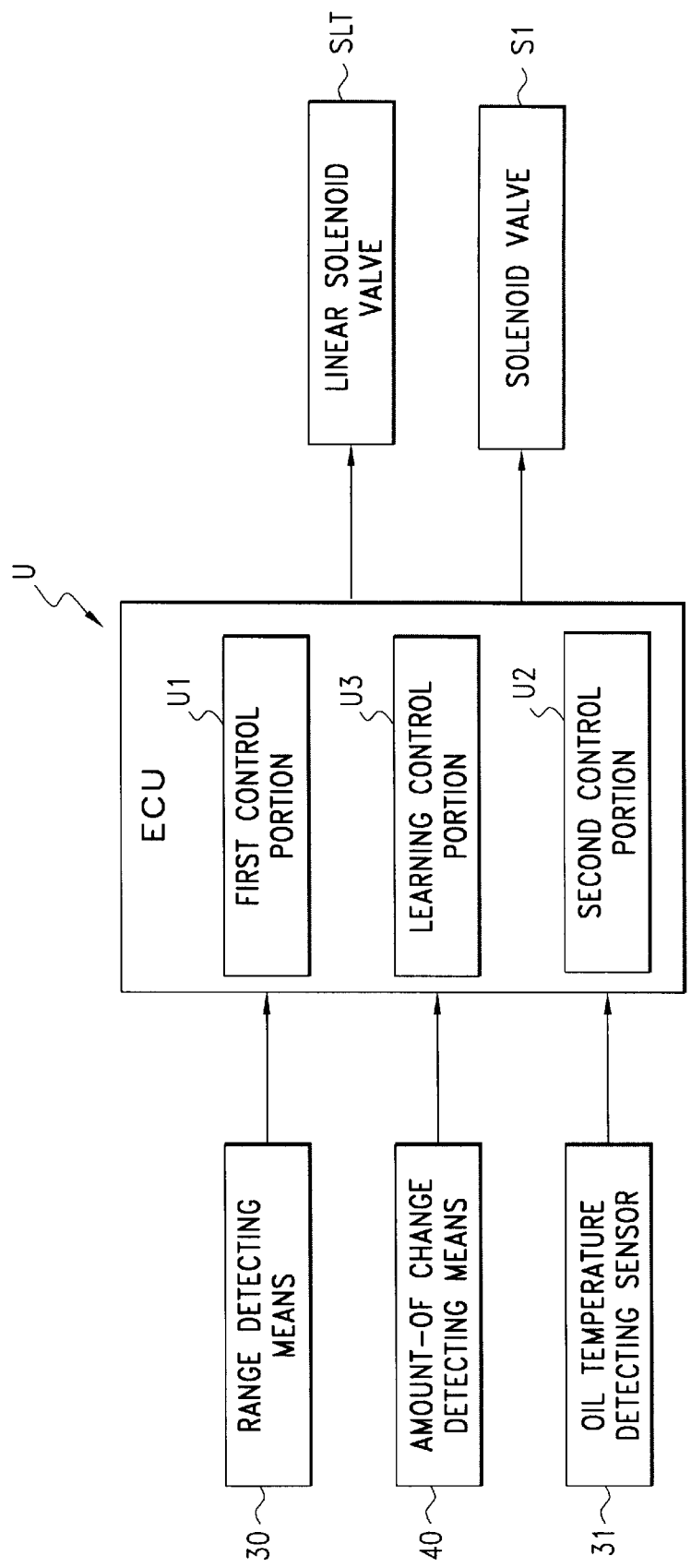
FIG. 1 is a block diagram of an electric control section of the apparatus of the invention.

FIG. 1 is a block diagram illustrating an electric control section, in which U represents control means (ECU) in the form of a vehicle-installed microcomputer. The ECU receives input of signals from range detecting means (sensor) 30 for detecting a range position of the shift lever, that is, the neutral (N) position and the running positions (e.g., the D range, the R range, etc.), from the oil temperature detecting means (sensor) 31 for detecting the oil temperature in the automatic transmission, and from the amount-of-change detecting means for detecting the amount of change, for example, the rotational acceleration (rotational speed changing rate) of the input shaft to be described below. The amount-of-change detecting means is illustrated here as an input shaft rotational speed sensor by way of example. On the basis of the input shaft rotational speed as detected by the rotation sensor, acceleration is computed by the control means U. The control means U includes a first control portion U1 and a second control portion U2. When a shift from a running (e.g., D) range to neutral (N) is detected by the range detecting means 30, the first control portion U1 selects a map of a discharge control pattern in accordance with the oil temperature or computes using a function related to the oil temperature, to obtain an instruction value in accordance with the oil temperature as a signal to a linear solenoid valve (control valve) SLT so as to control the discharge from the hydraulic servo of the forward clutch C1. The second control portion U2 determines whether the oil temperature is a low temperature that is less than or equal to a predetermined value, and outputs a switching signal to a solenoid valve S1. The control means U further includes a learning control section (described in detail below) that outputs a learned correction value to the first control portion U2.

Figure 4:
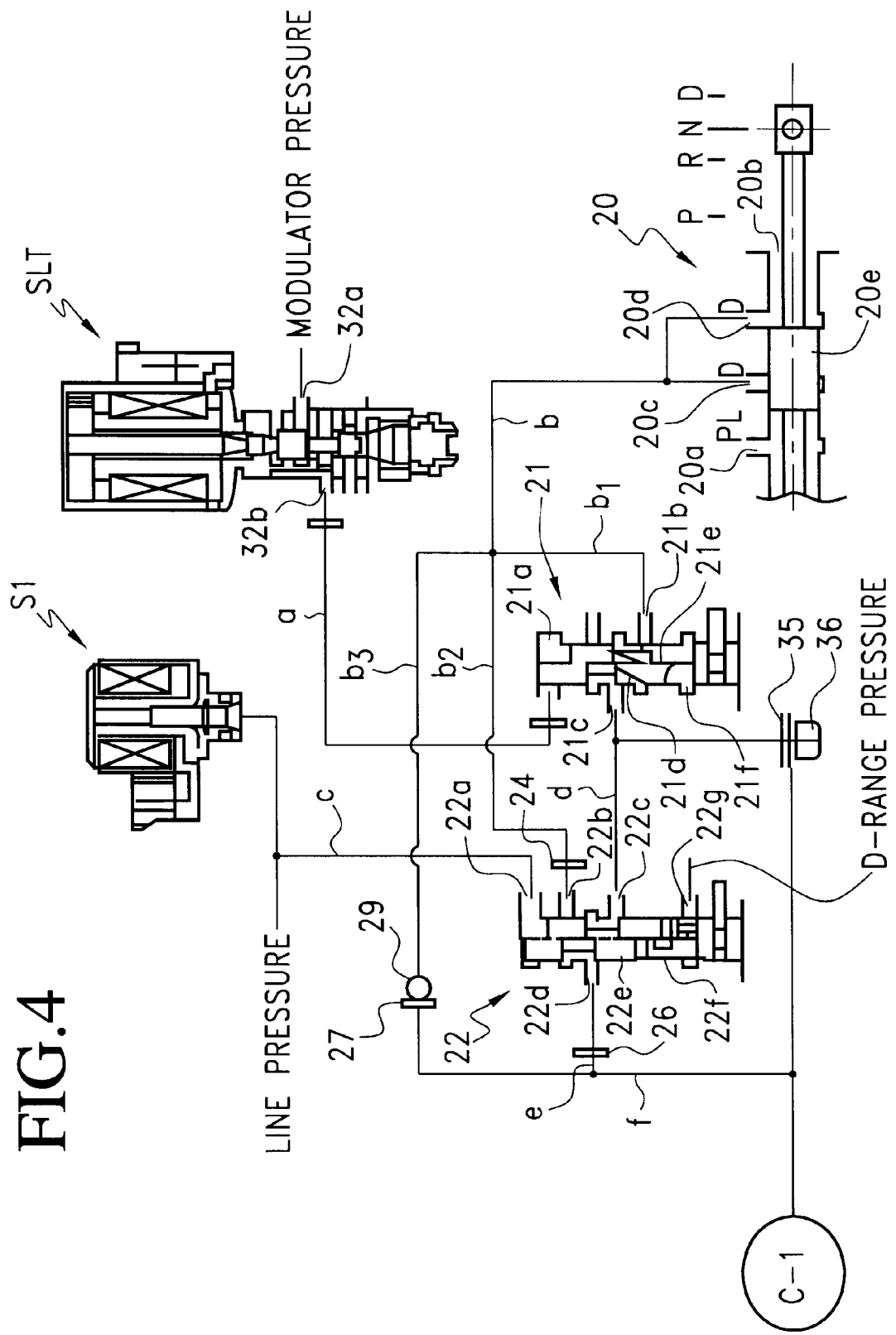
FIG. 4 is a circuit diagram of a hydraulic control section of the invention.

Now, a portion of the hydraulic control section will be described with reference to FIG. 4. In FIG. 4, reference numeral 20 represents a manual shift valve that is operated to change the range via a shift lever or the like (not shown). The valve 20 has a line pressure (base pressure) port 20a to which a line pressure PL from a primary regulator (not shown) is supplied, a drain port 20b, and two D (running) range ports 20c, 20d that are spaced apart by a predetermined distance (other ports are omitted from the illustration). In response to movement of the shift lever to another range position (P, R, N, D), the spool 20e opens/closes the various ports.

Reference numeral 21 represents a C1 control valve 21. The valve 21 has a control oil chamber 21a to which an output pressure from the linear solenoid valve (control valve) SLT is supplied via an oil passage a, an input port 21b in communication with the D range ports 20c, 20d of the manual shift valve 20 via oil passages b, $b_1$, an output port 21c, a drain port EX, and a feedback oil chamber 21f to which the oil pressure in the input port 21b is conveyed via a constricted passage 21e in a spool 21d.

Reference numeral 22 represents a neutral relay valve (changeover valve). The valve 22 has a control oil chamber 22a which receives the line pressure PL regulated by the solenoid valve S1 via an oil passage c, a first input port 22b in communication with the D range ports 20c, 20d via oil passages b, $b_2$ (an intervening orifice 24 is provided), a second input port 22c in communication with the output port 21c of the C1 control valve 21 via an oil passage d, an output port 22d, and an oil chamber 22g to which the D range pressure is supplied. A spring 22f under compression is disposed between the oil camber 22g and a spool 22e.

A hydraulic servo C-1 for the aforementioned forward (input) clutch is in communication with the output port 22d of the relay valve 22 via an oil passage e having an orifice 26, and communicates with the D range ports 20c, 20d via oil passages b, $b_3$, a check valve 29 having an orifice 27, and an oil passage f. Further, servo C-1 is connected to the oil passage d via a check valve 36 having an orifice 35, and an oil passage g. The check valve 29 disposed in the oil passage $b_3$ is designed so as to allow draining from the hydraulic servo C-1 and to prevent supply of oil pressure from the D range ports 20c, 20d. The check valve 31 disposed in the oil passage g is designed so as to allow supply of oil pressure from the oil passage d to the hydraulic servo C-1 and prevent draining from the hydraulic servo.

The linear solenoid valve SLT inputs, via an input port 32a, a modulated pressure that has been reduced and adjusted by a modulator valve, and outputs, via an output port 32b, a control pressure controlled in accordance with a signal (instruction value) from the first control portion U1 of the control means U. Normally, the linear solenoid valve SLT outputs the control pressure for controlling a throttle valve responsive to a signal pressure based on position of an accelerator pedal. At the time of the D→N or N→D range change of the shift lever, which does not require throttle pressure control, the linear solenoid valve SLT is used for the C1 control valve. The solenoid valve S1 is normally open. When the solenoid valve S1 is energized, the closed line pressure is supplied to the control chamber 22a of the neutral relay valve 22.

In the conventional system, at the time of a D→N shift, the forward (input) clutch hydraulic servo C-1 is entirely drained from the D range port 20d of the manual shift valve 20 to the drain port 20b thereof via the orifice 27 and the check valve 29 (oil passage f→$b_3$→b). According to the present invention, however, the diameter of the orifice 27 is reduced (e.g., changed from ϕ4 to ϕ2) to reduce the amount of flow via the orifice and the remainder of the draining is controlled by the C1 control valve 21 and/or the switching of the relay valve 22.

Next, operation of the hydraulic pressure control apparatus will be described with reference to FIGS. 4 and 5. If the shift lever is moved from N (neutral) to the drive (D) position (N→D) shift, the line pressure port 20a and the D range port 20c of the manual shift valve 20 are connected, and the other D range port 20d is closed. Here, the (D) position is not limited to the D range. The other forward running ranges where the forward (input) clutch is connected, including the L range, the 2-range and the like, are similar to the D range, and therefore are represented here by the D position. In the N→D shift, the solenoid valve S1 is energized and is in a closed state. In the neutral relay valve 22, the control oil chamber 22a is supplied with the line pressure from the oil passage c, so that the position indicated by a right-side half illustration in the drawing is assumed where the first input port 22b is closed and the second input port 22b is in communication with the output port 22d. In this state, the line pressure of the D range port 20c is supplied to the input port 22b of the C1 control valve 21 via the oil passages b, $b_1$.

In the C1 control valve 21, the control oil chamber 21a is supplied with the control pressure from an output port 32b of the linear solenoid valve SLT, and this pressure is adjusted by the oil pressure of the feedback oil chamber 21f, and the adjusted pressure is output from the output port 21c. The adjusted oil pressure is supplied to the hydraulic servo C-1 via the oil passage d, the orifice 35, the check valve 36 and the oil passage g, and is supplied also to the hydraulic servo C-1 via the oil passage d, the second input port 22c and the output port 22d of the neutral relay valve 22, the oil passage e, the orifice 26 and the oil passage f. Therefore, the forward (input) clutch hydraulic servo C-1 is supplied with the adjusted pressure based on the control pressure of the linear solenoid valve SLT, and the adjusted pressure smoothly rises, so that the forward clutch C1 engages without a N→D shift shock.

Furthermore, after the adjusted pressure supplied to the hydraulic servo C-1 rises to such a level as to completely engage the forward clutch C1, the solenoid valve S1 is denergized and opens, so that the neutral relay valve 22 assumes the left-half-indicated position due to release of the oil pressure from the control oil chamber 22a. In this state, the second input port 22c is shut off, and the first input port 22b is connected to the output port 22d, so that the line pressure from the D range port 20c is supplied to the hydraulic servo C-1 via the oil passage b, the orifice 24, the first input port 22b, the output port 22d, the oil passage e, the orifice 26 and the oil passage f. Therefore, the oil pressure is directly supplied to the hydraulic servo C-1, and the forward clutch C1 is kept in the completely engaged state.

Furthermore, with the accelerator released, the brake engaged and the vehicle speed zero, that is, when the vehicle is stopped, and the D range selected, it is also possible to adopt neutral (N) control to prevent a slow forward movement of the vehicle, that is what is generally termed creep, by closing the solenoid valve S1 so as to move the neutral relay valve 22 to the right-half indicated position, and by adjusting the pressure with the linear solenoid valve SLT so that the output pressure from the output port 21c of the C1 control valve 21 rises to the oil pressure that immediately precedes attainment of torque capacity by the hydraulic servo C-1, i.e., that immediately follows elimination of slip of the friction plates of the clutch C1, and by supplying the adjusted pressure to the hydraulic servo C-1 via the second input port 22c and the output port 22d of the neutral relay valve 22.

Next, pressure discharge control of the forward clutch hydraulic servo C-1, provided for the D→N shift operation in which the shift lever is moved from the D range position to the neutral (N) position and to which the learning control according to the invention is suitably applicable, will be described with reference to FIGS. 5 and 6. By the D→N shift operation, the manual shift valve 20 is positioned so that the D range port 20c is closed by the spool 20e and the other D range port 20d is connected to the drain port 20b as indicated in FIG. 4. In this state, the pressure of the forward clutch hydraulic servo C-1 is discharged via the oil passage f, the orifice 27, the check valve 29 and the oil passage $b_3$, b, and then from the D range port 20d to the drain port 20b.

Figure 5:
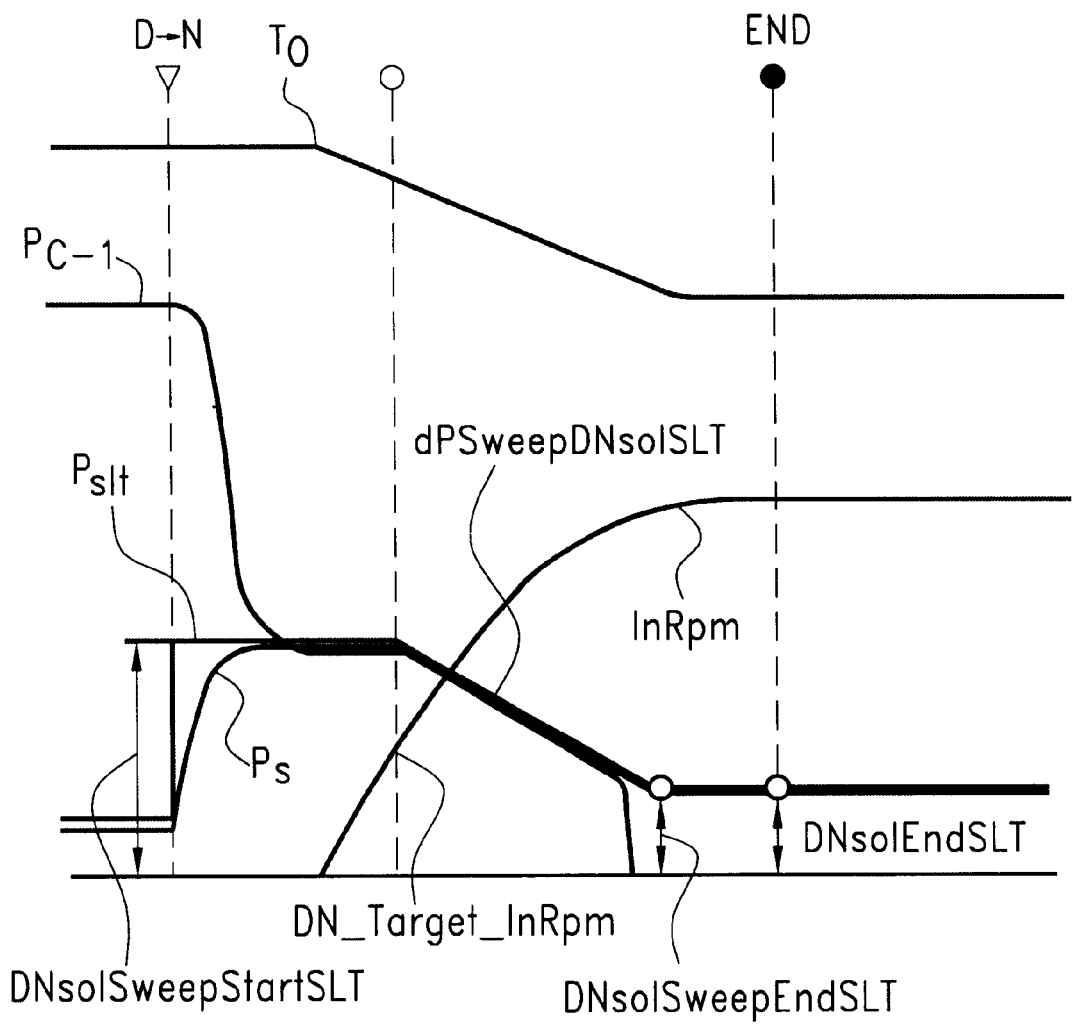
FIG. 5 is a time chart for a shift from the D range to neutral (N)
Figure 6:
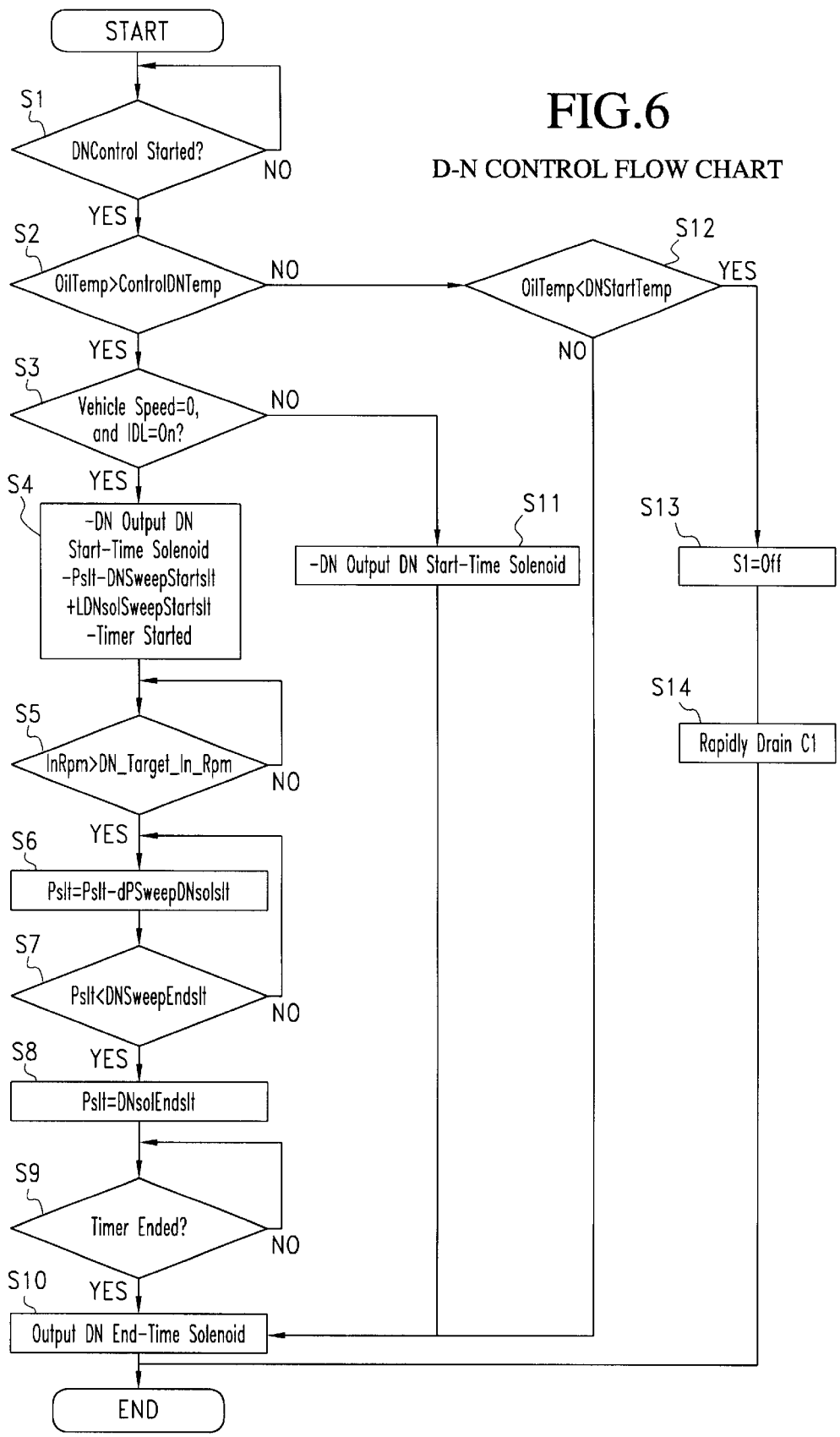
FIG. 6 is a flowchart of a D→N control routine.

Then, as illustrated in the time chart of FIG. 5 and the flowchart of FIG. 6, after the D→N operation is detected by the range detecting means 30 and the beginning of the DN control is determined (S1), the oil temperature (Oil Temp) of the automatic transmission detected by the oil temperature sensor (detecting means) 31 is compared with a predetermined lower-limit oil temperature (Control DN Temp) (S2). If the detected oil temperature is higher than the predetermined lower-limit oil temperature, it is then determined if the vehicle speed is zero and the throttle is in an idle state (IDL=ON) (S3). If the result of this determination is "YES", the first control section U1 of the control means U outputs a DN start-time solenoid signal, and an instruction value (P slt) for the linear solenoid valve SLT equal to a value obtained by adding a learning correction amount (LDN Sol Sweep Start SLT) to an initial pressure (DN Sweep Start SLT) for sweeping down the control pressure of the solenoid valve, and a timer is started (S4).

The SLT instruction value Pslt is retained until the input shaft rotational speed (=turbine rotational speed=C1 rotational speed) in rpm becomes higher than a pre-set sweep start-time rotational speed (DN_Target_in rpm) (S5). When the input shaft rotational speed reaches the sweep start-time rotational speed, the SLT instruction value (P slt) is swept down by a pre-set predetermined sweep angle (dP Sweep DN sol SLT) (S6). The sweep-down is continued until the SLT instruction value (P slt) reaches a pre-set sweep-down end pressure (DN Sweep End SLT) (S7). The instruction value (P slt) is kept at the sweep-down end pressure until the timer times out (S8, S9). Then, the first control section U1 outputs a DN end-time solenoid signal (S10), and the pressure discharge control of the forward clutch hydraulic servo C-1 by the first control section U1 ends.

That is, the solenoid valve S1 is closed, and the neutral relay valve 22 is switched to the right-half-indicated position, so that the first input port 22b is closed and the output port 22d is connected to the second input port 22c. Thus, the oil pressure of the hydraulic servo C-1 is conveyed to the output port 21c of the C1 control valve 21 via the oil passage f, the orifice 26, the oil passage e, the ports 22d, 22c, and the oil passage d. In this manner, that amount of drainage not passing through the orifice 27 of the oil passage $b_3$ is supplied to the C1 control valve 21 via the relay valve 22, so that the amount of oil discharged is controlled by the relay valve.

Simultaneously with the detection of the D→N operation by the range detecting means 30, the SLT instruction value (P slt) is transmitted from the first control section (U1) of the control means U to the linear solenoid valve SLT. On the basis of this electric signal, the linear solenoid valve SLT adjusts the modulator pressure of the input port 32a, and outputs a control pressure Ps from the output port 32b. The output control pressure Ps is supplied to the control oil chamber 21a of the C1 control valve 21. The degree of communication between the output port 21c and the input port 21b of the C1 control valve 21 is controlled so that the pressure of the hydraulic servo C-1 at the output port 21c is discharged via the oil passages $b_1$, b and then from the D range port 20d to the drain port 20b, so that the pressure on the hydraulic servo C-1 is controlled in a throttled manner. Therefore, the oil pressure $P_{C-1}$ of the forward hydraulic servo C-1 is first sharply reduced to a state where a predetermined torque capacity is retained (generally termed half-clutch state) due to the communication between the output port 21c and the drain port EX. Subsequently, the oil pressure $P_{C-1}$ is smoothly discharged under control of the C1 control valve 21 so that the forward clutch C1 is released without a D→N shift shock. The operation thus ends. Due to the aforementioned smooth release of the forward clutch C1, the output torque To is smoothly reduced to zero from a predetermined torque state, and the turbine rotational speed (rotational speed of the input shaft 3 in rpm) of the torque converter 4 smoothly rises and becomes approximately equal to the engine rotational speed.

The SLT instruction value (P slt) output from the first control section U1 to the linear solenoid valve SLT, is set in accordance with the oil temperature detected by sensor 31, either by selecting one of many maps prepared in accordance with different oil temperatures, or by computation by the first control section U1 using an equation that is a function related to the oil temperature.

If the determination in step S3 is "NO", that is, if the vehicle is running or the accelerator pedal is depressed, the DN start-time solenoid signal is output from the first control section U1 (S11). However, a DN end-time solenoid signal is then immediately output (S10). In reality, therefore, there is no pressure discharge control performed by the C1 control valve 21. The first control section U1 retains a pre-set DN control end-time instruction value (DN sol End SLT), and the C1 control valve 21 is retained at the right-half-indicated position, at which the output port 21c and the drain port EX are connected.

Conversely, if the determination in step S2 results in "NO", the oil temperature (Oil Temp) from the oil temperature detecting sensor is compared with a predetermined value (DN S1 off Temp) that is a pre-set low temperature (S12). If the oil temperature is between the control lower limit value (Control DN Temp) and the aforementioned set value, the DN end-time solenoid signal is immediately output (S10). Therefore, while the SLT instruction value (P slt) is retained at the sweep-down end value (DN sol End SLT), the C1 control valve 21 is retained at the right-half-indicated position, so that the oil pressure of the hydraulic servo C-1 is discharged from the output port 21c to the drain port EX.

If the determination in step S12 is "YES", that is, if the detected oil temperature is lower than the predetermined value (DN S1 off Temp), the solenoid valve S1 becomes OFF and opens (S13), so that the hydraulic servo C-1 is rapidly drained (S14).

That is, since the solenoid valve S1 is retained in the open state, the neutral relay valve 22 is retained in the left-half-indicated position. In this state, the oil pressure of the hydraulic servo C-1 is passed through the oil passage f, the orifice 26, the oil passage e, the output port 22d, the first input port 22b, the orifice 24 and the oil passages $b_2$, b, and is then discharged from the D range port 20d to the drain port 20b without being controlled. Therefore, the oil pressure of the hydraulic servo C-1 is discharged via the orifice 27 in the oil passage $b_3$ and via the neutral relay valve 22 without a response delay in the control, due to the relatively great area of flow corresponding to the low oil temperature.

As described above, at the time of the D→N operation, the shift shock is reduced through the control of the C1 control valve 21. Therefore, it becomes possible to omit a C1 accumulator that is needed in the conventional exclusively for the purpose of reducing shift shock at the time of the D→N operation. However, optionally a C1 accumulator may be provided as in the conventional art. Although the above-described control routine is applied to the gear train as shown in FIG. 2, it may also be applied in a similar manner to multi-speed transmissions (AT) having other gear trains, continuously variable transmissions (CVT) having a forward-reverse switching device, and the like. Furthermore, although the foregoing embodiment is described in conjunction with a shift between neutral and the forward ranges (D, L, 2, etc.) using the forward clutch as an input clutch, the embodiment may also be applied in a similar manner to a shift between neutral and reverse (R) using a clutch that is engaged for reverse running of the vehicle (e.g., the direct clutch C2) as an input clutch.

Still further, although the foregoing embodiment uses a linear solenoid valve (which may be replaced by the duty control of a solenoid valve) and a control valve that is regulated by the control oil pressure from the solenoid valve, control of the oil pressure on the hydraulic servo may be provided instead by a single control valve that allows direct adjustment to a predetermined oil pressure based on an electric signal. Furthermore, although the oil pressure for the hydraulic servo at the time of a shift from a running range to neutral is controlled in accordance with the oil temperature, this invention is not so limited. The oil pressure may also be controlled based on a different criterion at the time of the change, for example, whether the creep preventing control is functioning, or the like.

Learning control section U3 of the control means U will now be described, by way of example, as providing learning in the pressure discharge control of the forward clutch hydraulic servo C-1 by the C1 control valve 21, with reference to FIGS. 7 to 10. As described above, the pressure discharge from the hydraulic servo C-1 under control of the C1 control valve, in turn controlled by the first control section U1, is in parallel with the direct discharge through the oil pressure line $b_3$ provided with the check valve 29 and the orifice 27. Therefore, the pressure adjusting control needs to be performed within a short time, before complete discharge of the base pressure of the hydraulic servo via the orifice 27. It is desirable that this discharge control be optimized by the learning routine. Therefore, as indicated in step S4 of FIG. 6, an SLT instruction value (P slt) is set by adding a learned correction amount (LDN sol Sweep Start SLT) to an initial pressure (DN sweep Start SLT).

Figure 7:
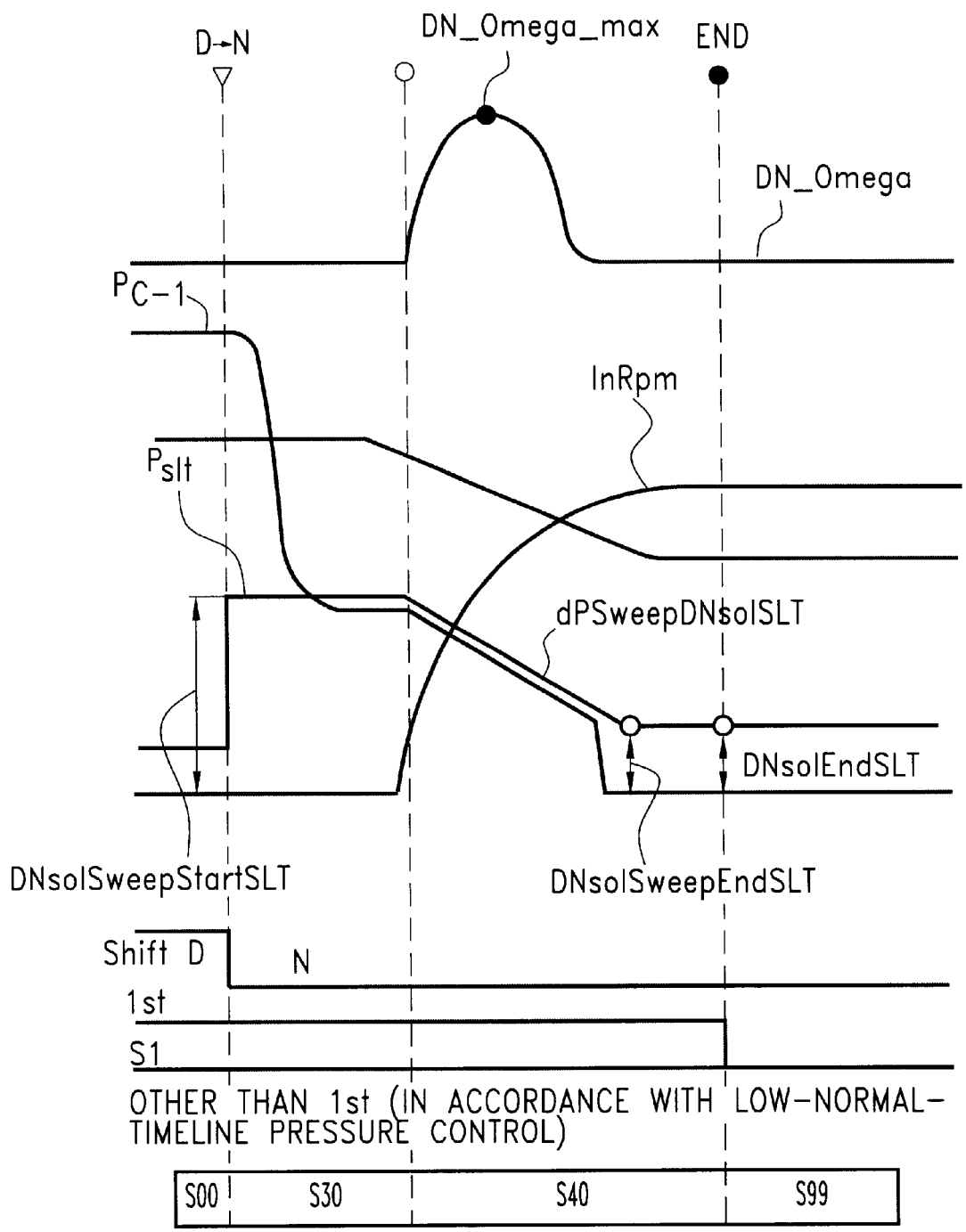
FIG. 7 is a time chart of execution of the D→N control routine of FIG. 6.
Figure 9A:
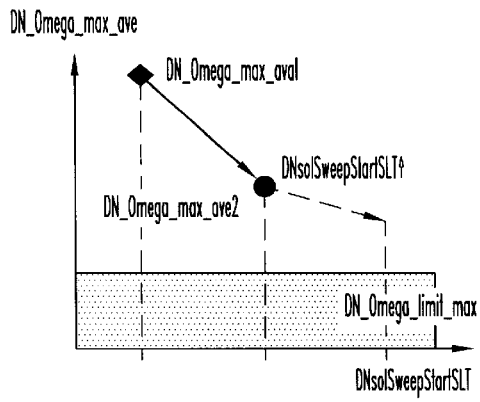
FIGS. 9A–9F are various maps ("rules") which may be utilized in the learning control.
Figure 9B:
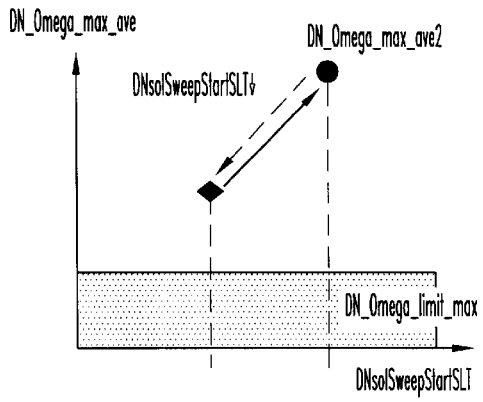
Figure 9C:
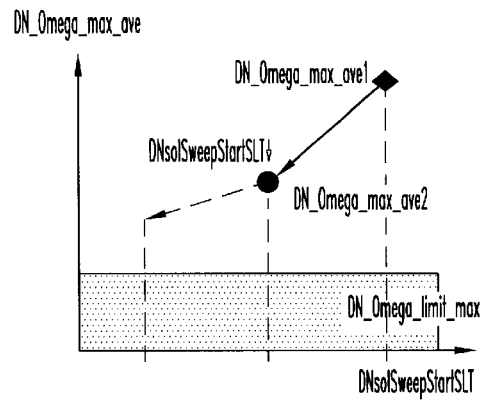
Figure 9D:
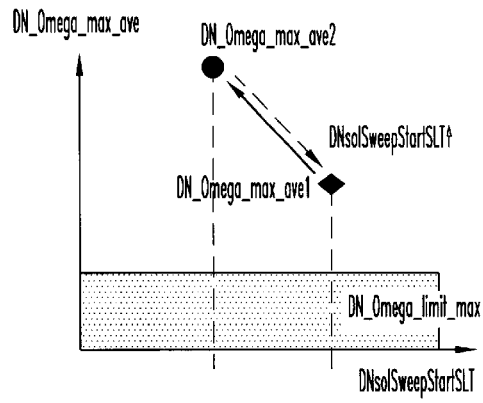
Figure 9E:
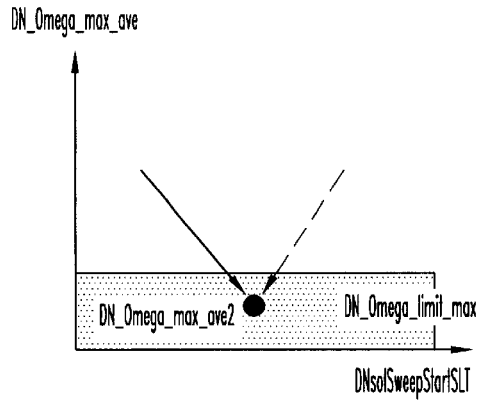
Figure 9F:
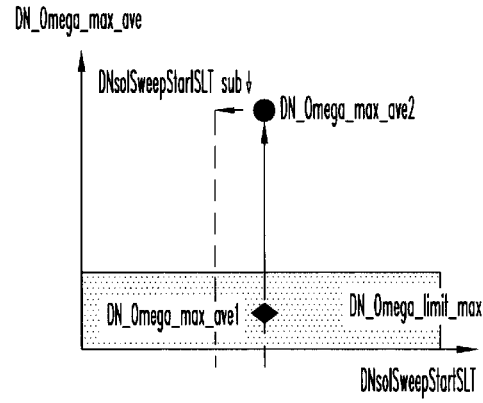

FIG. 7 is a time chart diagram, wherein the rotational acceleration (change in rotational rate) DN_Omega of the input shaft (=rotational speed of the forward hydraulic servo C-1=rotational speed of the turbine of the torque converter in rpm) is added the hydraulic servo $P_{C-1}$ and the SLT instruction value (P slt) as in FIG. 6. The rotational rate change has a peak (DN_Omega_max). The peak is used to estimate the magnitude (degree) of the D→N shift shock. If the initial value (DN sol Sweep Start SLT) of the SLT instruction value (P slt) is low, the oil pressure at the time of start of the discharge control of the hydraulic servo becomes low, and the torque capacity of the clutch sharply reduces to eliminate torque transfer. If the initial value is high, the torque capacity at the time of start of the discharge control of the hydraulic servo becomes excessively great, and the base pressure of the hydraulic servo (C-1) escapes via the orifice 27 before the pressure adjusting control, so that the torque is sharply reduced. Thus, in any case, the peak (DN_Omega_max) becomes great.

Therefore, in the learning control, the learning is performed so that the aforementioned initial value (DN sol Sweep Sart SLT) converges so as to reduce the peak (DN_Omega_max). During the D→N operation, for example, an average (DN_Omega_max_ave) of three peak values is acquired. The learning is performed by comparing the average (DN_Omega_max_ave1) of three peak values during the previous learning control and the average (DN_Omega_max_ave2) of three peak values during the present learning control. More specifically, the control using the peak value for learning is executed if all the following conditions are met during the D→N shift control:

(1) Engine rotational speed learn value:
  _EG_min≦_EGrpm<learn_EG_max rpm
(2) Transmission oil temperature:
  learn_OT_Tmin≦OT<learn_OT_max ° C.
(3) Degree of throttle opening: IDL ON
(4) The shift interval is greater than or equal to learn_garage Time_DN sec
(5) Vehicle speed is 0 km/h
(6) The D range is selected, and the N control is not performed.
(7) The D range is selected, and the gear speed is 1st.
(8) Failure is not detected.

In (1), learn_EG_min is a pre-set engine rotational speed that is, for example, 550 rpm, and learn EG max is a pre-set engine rotation speed that is, for example, 1200 rpm. The engine rotational speed EGrpm is within the range of 550 to 1200. In (2), learn_OT_min is a pre-set oil temperature for the automatic transmission that is, for example, 65° C., and learn_OT_max is an oil temperature. The oil temperature (OT) detected by the oil temperature detecting sensor 31 should be within the range (2). In (3), the throttle opening is at idle. In (4), learn_garageTime_DN is a shift interval in the DN control and is, for example, at least 2000 msec. Condition (5) is that the vehicle speed is zero, that is, stopped. Condition (6) requires that, in D range, N control (creep preventing control) is not in effect. Condition (7) requires that the selected range is the D range and the gear speed is first speed. Condition (8) is that failure is not detected.

It is preferable that all the conditions (1) to (8) be met before initiating the learning control of the present invention. However, it is also possible that some of the conditions be omitted and the learning control be initiated based on satisfaction of only a minimum number of necessary conditions.

Figure 10:
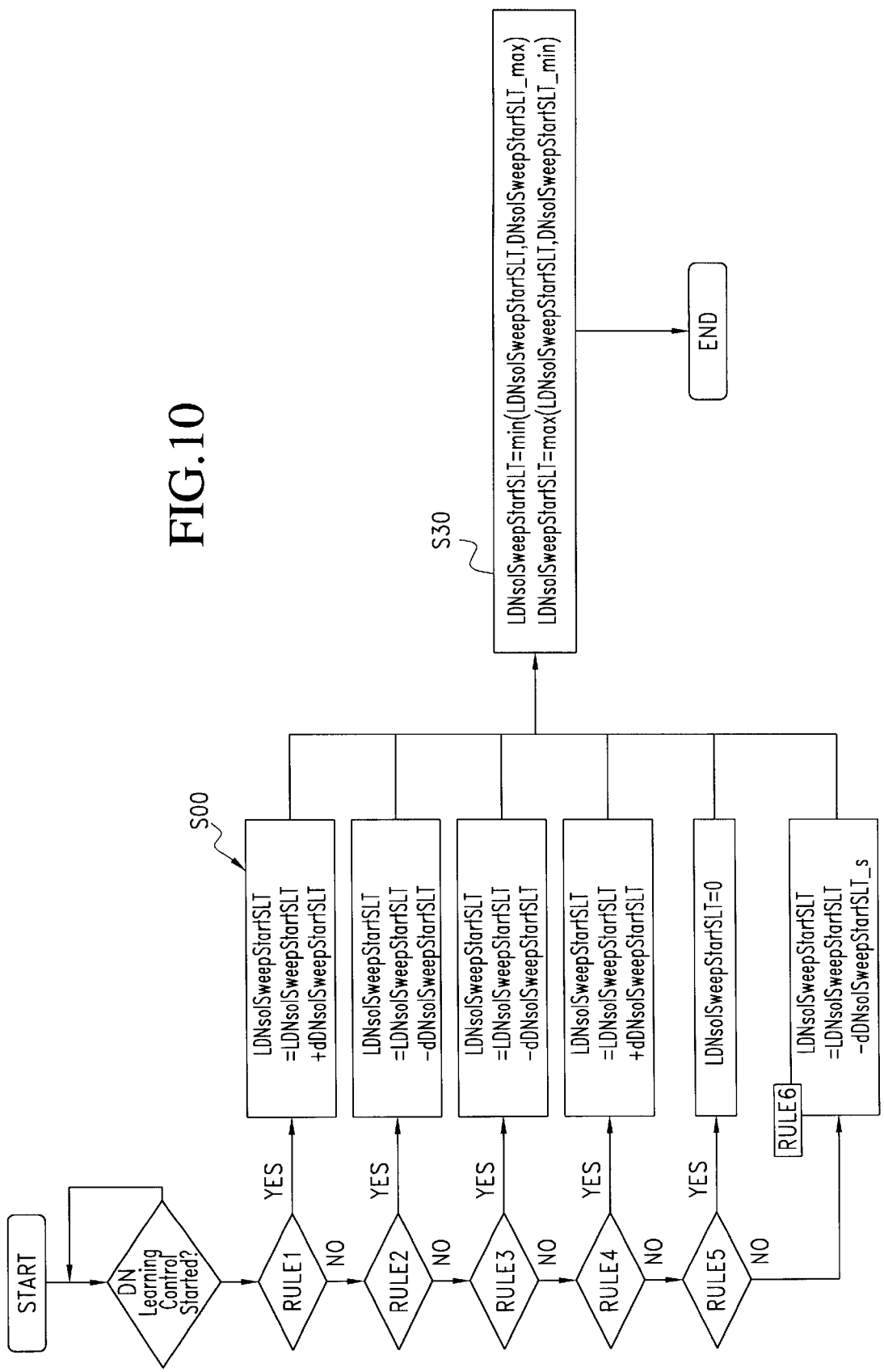
FIG. 10 is a flowchart of the learning control in accordance with the invention.

Referring to FIGS. 8, 9 and 10, as indicated by map (or "rule") 1 (FIG. 9A), if an initial value (DN sol Sweep Start SLT) has been increased in the previous learning and the present peak value (DN_Omega_max_ave2) is lower than the previous peak value (DN_Omega_max_ave1), the convergence region of the initial value is on the increase side, and therefore the initial value (LDN sol Sweep Start SLT) is set as a value that is increased by a predetermined amount (dDN sol Sweep Start SLT). During the next D→N shift, the corrected initial value (LDN sol Sweep Start SLT) is used for the pressure adjusting control. As indicated by map 2 (FIG. 9B), if the initial value (DN sol Sweep Start SLT) has been increased in the previous learning and the present peak value (DN_Omega_max_ave2) is higher than the previous peak value (DN_Omega_max_ave1), the convergence region of the initial value is on the decrease side, and therefore the initial value (LDN sol Sweep Start SLT) is set as a value that is decreased by a predetermined amount (dDN sol Sweep Start SLT). During the next D→N shift, the corrected initial value (LDN sol Sweep Start SLT) is used for the pressure adjusting control. As indicated by map 3 (FIG. 9C), if the initial value (DN sol Sweep Start SLT) is decreased in the previous learning and the present peak value (DN_Omega_max_ave2) is lower than the previous peak value (DN_Omega_max_ave1), the convergence region of the initial value is on the decrease side, and therefore the initial value (LDN sol Sweep Start SLT) is set as a value that is decreased by a predetermined amount (dDN sol Sweep Start SLT). During the next D→N shift, the corrected initial value (LDN sol Sweep Start SLT) is used for the pressure adjusting control.

As indicated by map 4 (FIG. 9D), if the initial value (DN sol Sweep Start SLT) has been decreased in the previous learning and the present peak value (DN_Omega_max_ave2) is higher than the previous peak value (DN_Omega_max_ave1), the convergence region of the initial value is on the increase side, and therefore the initial value (LDN sol Sweep Start SLT) is set as a value that is increased by a predetermined amount (dDN sol Sweep Start SLT). During the next D→N shift, the corrected initial value (LDN sol Sweep Start SLT) is used for the pressure adjusting control. As indicated by map 5 (FIG. 9E), if the present peak value (DN_Omega_max_ave2) is lower than a threshold value (DN_Omega_limit_max) of the amount of change in rotational speed, it is determined that the initial value (DN sol Sweep Start SLT) is within the convergence region and is proper. Therefore, the initial value is not increased or decreased. As indicated as map 6 (FIG. 9F), if the previous peak value (DN_Omega_max_ave1) is lower than the threshold value (DN_Omega_limit_max) but the present peak value (DN_Omega_max_ave2) becomes higher than the threshold value due to a small variation, it is determined that the initial value is near the convergence region. Then, the initial value (DN sol Sweep Start SLT) is set as a value that is decreased by a value (dDN sol Sweep Start SLT_S) that is smaller than the predetermined value (about half the predetermined value). During the next D→N shift, the corrected initial value (LDN sol Sweep Start SLT) is used for the pressure adjusting control.

As described above, learning correction of the initial value (LDN sol Sweep Start SLT) based on maps 1 to 6 during a D→N shift (see step S00 in FIGS. 8 and 10) involves a maximum or minimum calculation in step S30. That is, if the learned initial value (LDN sol Sweep Start SLT) is to be corrected to the increase side, the smaller one of the learned initial value (LDN sol Sweep Start SLT) and a pre-set maximum limit initial value (DN sol Sweep Start SLT_max) is set as a learned initial value (LDN sol Sweep Start SLT). If the learned initial value (LDN sol Sweep Start SLT) is to be corrected to the decrease side, the greater one of the learned initial value (LDN sol Sweep Start SLT) and a pre-set minimum limit initial value (DN sol Sweep Start SLT_min) is set as a learned initial value (LDN sol Sweep Start SLT).

Although the above-described learning control is suitable for use in the control of discharging pressure from the hydraulic servo at the time of a D→N shift or the like, application is not so limited. The learning control is also applicable to the other range shifts, such as the R→D shift, the N→D shift, the R→D shift, etc. and to speed change shifts, such as the 1→2 speed shift, the 2→1 speed shift, etc.

While the invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. An automatic transmission hydraulic pressure control apparatus comprising:
   control valve means for adjusting and controlling, in accordance with an instruction value, a hydraulic pressure of a hydraulic servo operating a friction engagement element that switches between a first state and a second state in a shift;
   amount-of-change detecting means for detecting an amount of change in rotational speed of a rotating transmission element caused by a switch between the first state and the second state; and
   a controller having learning control means for correcting the instruction value for the control valve based on comparison between the amount of change caused by a previous switch and the amount of change caused by a present switch,
   wherein control of the control valve means related to a subsequent switch is performed based on the instruction value from the controller corrected by the learning control means.

2. The automatic transmission hydraulic pressure control apparatus according to claim 1, wherein the learning control means corrects the instruction value based on the comparison between the previous amount of change and the present amount of change and direction of a previous correction.

3. The automatic transmission hydraulic pressure control apparatus according to claim 2, wherein the learning control means has a plurality of maps for determining a subsequent correction value and a subsequent correcting direction based on the comparison between the previous amount of change and the present amount of change and the direction of the previous correction.

4. The automatic transmission hydraulic pressure control apparatus according to claim 1, wherein the amount-of-change detecting means detects the amount of change for a mean value obtained for a plurality of switches.

5. The automatic transmission hydraulic pressure control apparatus according to claim 2, wherein said controller makes a correction of the instruction value which increases the amount of change if the instruction value is above or below a convergence region, wherein the amount of change is at most a predetermined threshold, and wherein a direction of the correction is toward the convergence region.

6. The automatic transmission hydraulic pressure control apparatus according to claim 5, wherein if the previous amount of change is within the convergence region and the present amount of change is outside the convergence region, the instruction value is corrected by lowering the instruction value by a predetermined amount.

7. The automatic transmission hydraulic pressure control apparatus according to claim 3, wherein said controller makes a correction of the instruction value which increases the amount of change if the instruction value is above or below a convergence region, wherein the amount of change is at most a predetermined threshold, and wherein a direction of the correction is toward the convergence region.

8. The automatic transmission hydraulic pressure control apparatus according to claim 7, wherein if the previous amount of change is within the convergence region and the present amount of change is outside the convergence region, the instruction value is corrected by lowering the instructional value by a predetermined amount.

9. The automatic transmission hydraulic pressure control apparatus according claim 1, wherein the amount of change is detected as a change in a peak value of rotational acceleration of an input portion of the friction engagement element.

10. The automatic transmission hydraulic pressure control apparatus according to claim 1, wherein the controller outputs a predetermined initial value at a time of the switch, and then outputs a sweep-down at a predetermined sweep angle, and the learning control means corrects the predetermined initial value.

11. The automatic transmission hydraulic pressure control apparatus according to claim 10, wherein the predetermined initial value is set based on an oil temperature in the automatic transmission.

12. The automatic transmission hydraulic pressure control apparatus according to claim 1, wherein the switch between the first state and the second state is a switch from a running range to neutral of a manual shift valve, and the friction engagement element is an input clutch.

13. The automatic transmission hydraulic pressure control apparatus according to claim 12, wherein the control valve means includes a first control valve disposed between the hydraulic servo and a running range port of the manual shift valve, and a second control valve that controls the first control valve by adjusting a control pressure to the first control valve, said control pressure being based on the instruction value from the controller.

14. The automatic transmission hydraulic pressure control apparatus according to claim 13, further comprising a first oil passage having an orifice and a check valve and providing a direct fluid connection between the hydraulic servo and the running range port, said first oil passage being arranged parallel with a second oil passage having the first control valve.

15. The automatic transmission hydraulic pressure control apparatus according to claim 1, wherein said rotating transmission element is the transmission input shaft.

16. The automatic transmission hydraulic pressure control apparatus of claim 1 wherein the shift is a shift between speed stages in drive range.

* * * * *